United States Patent [19]

Pennebaker, Jr. et al.

[11] Patent Number: 4,532,651
[45] Date of Patent: Jul. 30, 1985

[54] DATA FILTER AND COMPRESSION APPARATUS AND METHOD

[75] Inventors: William B. Pennebaker, Jr., Carmel; Keith S. Pennington, Somers, both of N.Y.

[73] Assignee: International Business Machines Corporation, Armonk, N.Y.

[21] Appl. No.: 429,658

[22] Filed: Sep. 30, 1982

[51] Int. Cl.³ ............................................. G06K 9/36
[52] U.S. Cl. ..................................... 382/54; 358/284
[58] Field of Search ........................ 382/50, 51, 52, 53, 382/54, 55; 358/282, 284, 283; 371/67, 69, 57, 60, 61, 62, 65, 55

[56] References Cited

U.S. PATENT DOCUMENTS 4,280,144 7/1981 Bacon .................................... 382/50
4,301,443 11/1981 Sternberg et al. ..................... 382/27

Primary Examiner—Leo H. Boudreau
Assistant Examiner—Michael M. Murray
Attorney, Agent, or Firm—G. E. Clark; Jack M. Arnold

[57] ABSTRACT

A gray scale filter for image data is described which forces a least significant bit of a current pel equal to a most significant bit of the current pel when the most significant bit of the current pel is equal to the most significant bit of a previous and a next pel on a scan line of an image. The invention is embodied in a logic structure employing exclusive ORs to make comparisons between the previous, next and current pels and logic gates to gate the value of the most significant bit of the most current pel to an output representing a filtered least significant bit of the current pel. It should be noted that the value of the most significant bit of the current pel is not changed since only changes between gray-white and white or gray-black and black are filtered by the present invention.

7 Claims, 2 Drawing Figures

DATA FILTER AND COMPRESSION APPARATUS AND METHOD

BACKGROUND OF THE INVENTION

1. Field of the Invention

The present invention relates to image data enhancement apparatus and methods, and more particularly to apparatus and methods of filtering data for enhancement of images and efficient data storage and transmission.

2. Description of the Prior Art

In the prior art there are image data compression systems available. The following are systems known to the inventors herein.

U.S. Pat. No. 4,006,298 generally discloses a system having an image gray scale using 64 discrete levels of brightness. However, the patent does not disclose a method for filtering gray scale transitions based upon comparison of predetermined bits of a current picture element with previous and subsequent picture elements.

U.S. Pat. No. 4,177,470 shows a system wherein a binary data signal is operated on to reduce the number of bits in the signal without reducing information content of the signal. The patent shows basically a data compression system. However, the patent does not disclose apparatus or method for filtering gray scale transitions in image data based upon comparison of current picture element information with previous and subsequent picture element information.

IBM Technical Disclosure Bulletin, Vol. 22, No. 7, December 1979, pages 2980–2985, J. L. Mitchell, "Vertical Reference Coding for Digital Gray-Level Images", discloses a data compression scheme for gray level images which recognizes and employs vertical redundancy. Three methods are disclosed for coding gray scale data relative to corresponding picture element positions on a previous scan line. All three methods rely on the value of the preceding pel in employing vertical redundancy to compress image data. The concept disclosed in the referenced article, differs from the present invention in that the article does not disclose a method for filtering gray scale transitions in image data based upon a comparison of predetermined bits of a current picture element with corresponding bits of a previous picture element and a subsequent picture element to detect a gray scale transition.

U.S. Pat. No. 4,210,936 shows a method and apparatus which achieves compression of image data by a reduction matrix which utilizes less gray scale data than is generated from the original picture element matrix. For example, if a picture element gray level requires four bits of data, then the reproduction of the gray scale requires only one bit of data. The patent differs from the present invention in that a gray scale function signal is required in addition to the picture element signal to adequately reproduce the original image and, there is no gray scale filtering shown in the patent as is disclosed and claimed with respect to the present invention.

U.S. Pat. No. 4,229,768 teaches an apparatus which compresses binary image signals by a selective run length compression technique. Although the patent does show the comparision of a sequence of picture elements in a scan line, there is no method or apparatus for filtering gray scale transitions based upon the results of such comparison.

U.S. Pat. No. 4,280,144 discloses apparatus and method for improving quality of a course scan, line print image processing system. An encoder assigns a code to a coarsely scanned picture element representative of the reflectance characteristic thereof. For fine reproduction of coarsely scanned data, the coarsely scanned picture element is summed with at least four adjacent horizontal and vertical picture elements to reproduce a fine picture element comprising at least four subelements. Although the patent obtains information for determining a fine value of a particular picture element from adjacent picture elements, the patent in effect teaches a method for expanding data from a coarse scan to a fine representation and does not in fact filter image data based upon detection of gray scale transitions as is disclosed and claimed by the present invention.

The prior art of which the inventors herein are aware does not show nor suggest the apparatus and method disclosed and claimed herein.

SUMMARY OF THE INVENTION

Therefore, it is an object of the present invention to filter gray scale image data by comparing a predetermined bit of a current picture element with a corresponding bit of a previous picture element and a subsequent picture element and changing the value of another bit in the binary representation of the picture element if a true compare is achieved.

It is another object of the present invention to filter gray scale image data as above wherein a most significant bit of the digital representation of each of the above-identified picture elements is employed to detect gray scale transition.

Yet another object of the present invention is to filter gray scale image data as above wherein a least significant bit of each of the above-identified picture elements is set equal to a most significant bit on a valid compare.

It is still a further object of the present invention to filter gray scale image data as above wherein the previous picture element and subsequent picture elements are adjacent to the current picture element which is being filtered.

Still another object of the present invention is to compress image data for storage or transmission as a result of the filtering of the gray scale image.

The foregoing and other objects, features and advantages of the invention will be apparent from the more particular description of the preferred embodiments of the invention, as illustrated in the accompanying drawing.

BRIEF DESCRIPTION OF THE DRAWING

In the figures, like elements are designated with similar reference numbers.

DESCRIPTION OF THE PREFERRED EMBODIMENTS

Figure 1:
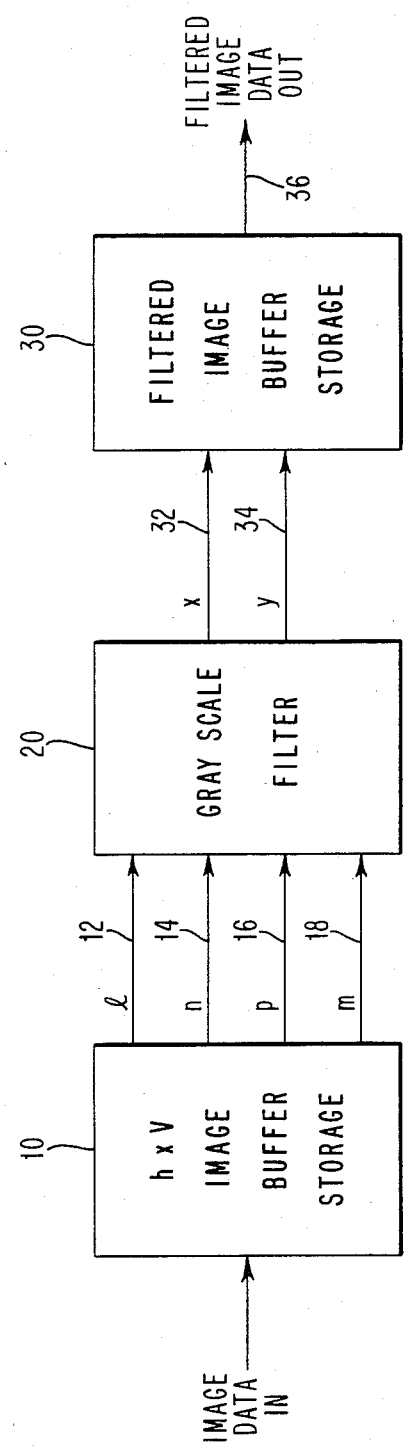
FIG. 1 is a block diagram of a system including a gray scale filter according to the present invention.

Referring now to FIG. 1, the apparatus and method according to the present invention will be described.

Raw image data is presented to image buffer storage 10 wherein each picture element or pel is represented by a plurality of binary bits, for example, two bits, wherein there is a most significant bit and a least significant bit.

Image buffer storage 10 stores the image data of an entire frame of an image. Logic means well known to those skilled in the art are included in the outputs of image buffer storage 10 to provide signals l 12 and 14 p 16 and m 18 which represents the following:

l—least significant bit of current picture element;
m—most significant bit of current pel.
n—most significant bit of next pel after current pel on same line;
p—most significant bit of previous pel on same line;

Gray scale filter 20 accepts the four inputs set out above and produces filtered outputs x 32 and y 34 wherein x represents the most significant bit of the filtered current pel and y represents the least significant bit of the filtered current pel. Filtered data x and y is presented to filtered image buffer storage 30 where the filtered image is stored until required for transmission or other use when it is gated out on filtered image data outline 36. Gray scale filter 20 operates in accordance with the following two formulas producing the outputs shown in table I below.

$$x = m \quad \quad (a)$$

$$y = l\,[(nXOm) + (pXOm)] + m\overline{[(nXOm) + (pXOm)]} \quad (b)$$

TABLE I

| INPUTS | | | | OUTPUTS | |
|---|---|---|---|---|---|
| p | n | m | l | x | y |
| 0 | 0 | 0 | 0 | 0 | 0 * |
| 0 | 0 | 0 | 1 | 0 | 0 * |
| 0 | 0 | 1 | 0 | 1 | 0 |
| 0 | 0 | 1 | 1 | 1 | 1 |
| 1 | 0 | 0 | 0 | 0 | 0 |
| 1 | 0 | 0 | 1 | 0 | 1 |
| 1 | 0 | 1 | 0 | 1 | 0 |
| 1 | 0 | 1 | 1 | 1 | 1 |
| 0 | 1 | 0 | 0 | 0 | 0 |
| 0 | 1 | 0 | 1 | 0 | 1 |
| 0 | 1 | 1 | 0 | 1 | 0 |
| 0 | 1 | 1 | 1 | 1 | 1 |
| 1 | 1 | 0 | 0 | 0 | 0 |
| 1 | 1 | 0 | 1 | 0 | 1 |
| 1 | 1 | 1 | 0 | 1 | 1 * |
| 1 | 1 | 1 | 1 | 1 | 1 * |

Figure 2:
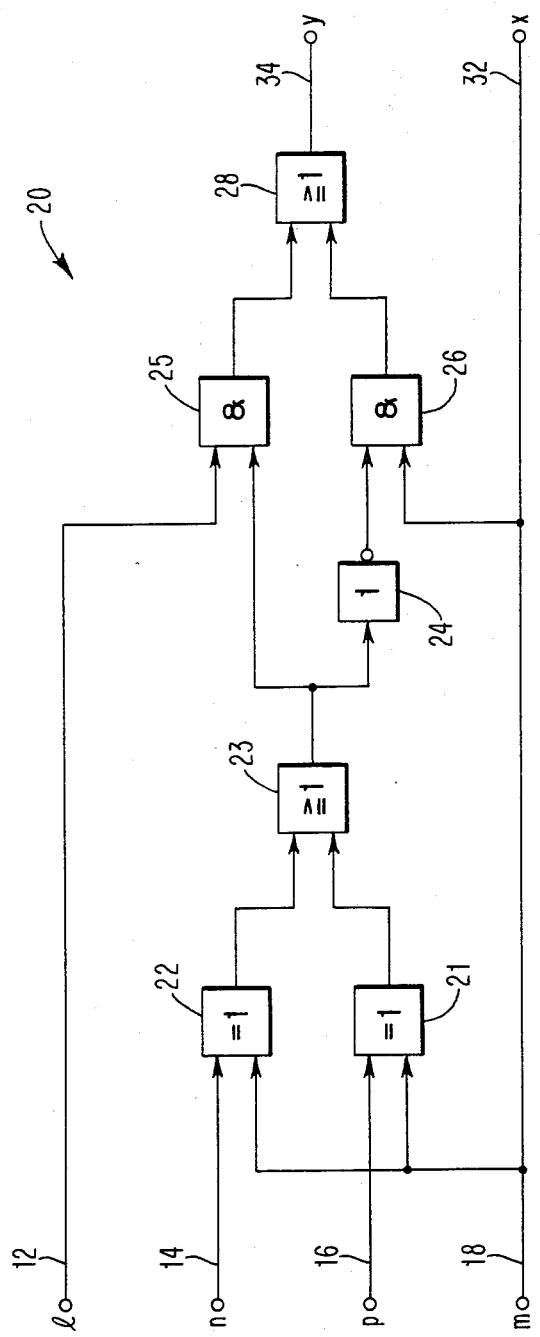
FIG. 2 is a logic diagram of the gray scale filter according to the present invention.

Referring now to FIG. 2, the detailed logic of an implementation of gray scale filter 20 will be described.

As discussed above, it can be seen that the inputs provided on lines 12, 14, 16 and 18 are respectively the least significant bit of the current pel, the most significant bit of the next pel, the most significant bit of the previous pel and the most significant bit of the current pel. The outputs are the most significant filtered bit and the least significant filtered bit on lines 32 and 34 respectively. It can be readily seen that filter 20 does not affect any change in the most significant bit of the current pel since there is a direct connection between input m line 18 and output x line 32.

However, when the most significant bit of the current pel is equal to the most significant bits of the immediately previous and immediately succeeding pels on a line the value of the current pel is filtered by forcing output y equal to output x. In the convention employed in this description of a preferred embodiment, the following are the gray scale values for corresponding pel values expressed in a binary table wherein each pel is represented by a two binary bit signal.

TABLE II

| Gray Scale | m | L |
|---|---|---|
| White | 0 | 0 |
| Gray-white | 0 | 1 |
| Gray-black | 1 | 0 |
| Black | 1 | 1 |

Referring again to Table I, it can be seen that there are only four input conditions out of a possible 16 input conditions where the identified most significant bits are the same. In the Table these conditions are represented by the asterisks (*) following the outputs. In the other 12 input combinations, there is no filtering of the gray scale information and the least significant bit of the current pel is not changed. As can be seen from equation b above and the logic of FIG. 2, filter 20 operates as follows. Input n is compared with input m by exclusive OR 22 and input p is compared with input m by exclusive OR 21. The outputs of exclusive ORs 21 and 22 are connected to OR circuit 23 so that if the most significant bits of the three adjacent pels are the same, a zero or low signal appears as an input to AND circuit 25 and inverter 24. Since AND 25 is disabled, the value of the least significant bit of a current pel on line 12 is disregarded. However, the low signal at the input to inverter 24 becomes a high or a one as an enabling input to AND 26 providing an output from AND 26 equal to the most significant bit of the current pel. The output of AND 26 is connected to one input of OR 28 which provides as an output on line 34 the filtered least significant bit identified as y.

From the above description, it can be seen that if the most significant bits of the current pel and the immediately previous and immediately succeeding pels are the same, the value of the most significant bit appearing on line 18 is gated through AND 26 and OR 28 and forces the filtered least significant bit of the current pel on line 34 equal to the most significant bit.

Again referring to Table I, it can be seen that this situation occurs in only two of the 16 possible conditions. It occurs only in those two conditions where the three most significant bits are equal and the least significant bit is different from the most significant bit of the most current pel.

The above description of a preferred embodiment describes an apparatus and method for elimination of gray scale speckle from graphics images which have been thresholded prior to filtering to a two bit value representing four levels of gray scale. The filtering process described removes isolated gray scale speckle but preserves gray scale values whenever there is a transition in the most significant bit either from the previous pel to the current pel or from the current pel to the subsequent pel.

Although the present embodiment has been described with respect to one dimension along a single horizontal scan line, two dimensional implementations are readily devised but of course would require further hardware to implement.

Thus, while the invention has been described with reference to preferred embodiments thereof, it will be understood by those skilled in the art that various changes in form and details may be made without departing from the scope of the invention.

Having thus described our invention, what we claim as new and desire to secure by Letters Patent is:

1. In an image processing system including a grey scale filter apparatus, a method for filtering grey scale image data, wherein each picture element in a line of said image is represented by a binary signal containing at least two bits, one of said bits being a most significant bit and another of said bits being a least significant bit, comprising the steps of:
   comparing in a first logic network, the most significant bit of a current picture element with the most significant bit of a previous picture element and the most significant bit of a subsequent picture element in the same line;
   changing, in a second logic network, the value of the least significant bit of said current picture element in response to the most significant bit of each of said current picture element, said previous picture element and said subsequent picture element having the same binary value, and the least significant bit and the most significant bit of the current picture element having a different binary value.

2. A method according to claim 1 wherein said previous picture element and said subsequent picture element are each adjacent to said current picture element in said same line.

3. Apparatus for filtering grey scale image data, wherein each picture element in a line of said image is represented by a binary signal containing at least two bits, one of said bits being a most significant bit and another of said bits being a least significant bit, comprising:
   means for comparing the most significant bit of a current picture element with the most significant bit of a previous picture element and the most significant bit of a subsequent picture element in the same line; and
   means responsive to the comparison for changing the value of the least significant bit of said current picture element in response to the most significant bit of each of said current picture element, said previous picture element and said subsequent picture element having the same binary value, and the least significant bit and the most significant bit of the current picture element each having a different binary value.

4. Apparatus according to claim 3, further comprising:
   means for storing said image data and for providing as outputs thereof, a first signal representing the most significant bit of said previous picture element; a second signal representing the most significant bit of said next picture element; a third signal representing the most significant bit of said current picture element; and a fourth signal representing the least significant bit of said current picture element.

5. Apparatus according to claim 6, further comprising:
   means connected to said changing means for storing filtered image data for transmission to a remote location.

6. In an image processing apparatus for a grey scale image, wherein each picture image in a line of said image is represented by a binary signal comprised of at least two bits, one of said bits being a most significant bit and another of said bits being at least significant bit, the combination comprising:
   an image storage device for storing each line of binary information of said image, and including a first output at which the most significant bit of a current picture element in a given line is manifested, a second output at which the most significant bit of the previous picture element in said given line is manifested, a third output at which the most significant bit of the next picture element in said given line is manifested and a fourth output at which the least significant bit of said current picture element in said given line is manifested;
   a grey scale filter having first, second, third and fourth inputs connected to the first, second, third and fourth outputs, respectively of said image storage device, including means for changing the least significant bit value of said current picture element as manifested at the fourth input in response to the first, second and third inputs having the same binary value, and said first and fourth inputs having different values, and including first and second outputs from said filter at which the most significant bit and least significant bit value, respectively are manifested; and
   an image storage device having first and second inputs connected to the first and second outputs, respectively, of said filter for storing the most significant bit value and least significant bit value for each filtered picture element in each line of said grey scale image.

7. The combination claimed in claim 6, wherein said grey scale filter comprises:
   a first XOR gate having first and second inputs connected to the first and second inputs, respectively, of said filter for receiving the most significant bit values of said current and previous picture elements, respectively, and including an output;
   a second XOR gate having first and second inputs connected to the first and third inputs, respectively, of said filter for receiving the most significant bit values of said current and next picture elements, respectively, and including an output;
   a first OR gate having first and second inputs connected to the output of said first and second XOR gates, respectively, and including an output;
   an inverter having an input connected to the output of said first OR gate, and including an output;
   a first AND gate having a first input connected to the first input of said filter for receiving the most significant bit value of said current picture element, and a second input connected to the output of said inverter, and including an output;
   a second AND gate having a first input connected to the fourth input of said filter for receiving the least significant bit value of said current picture element, and a second input connected to the output of said first OR gate, and including an output;
   a second OR gate having first and second inputs connected to the outputs of said first and second AND gates, respectively, and including a first filter output terminal at which is manifested the grey scale filter output value of the least significant bit of said current picture element; and
   a second filter output terminal connected to said first input of said filter for receiving the most significant bit value of said current picture element, with the grey scale filter output value of the most significant bit value of said current picture element being manifested at said second filter output terminal.

* * * * *